(12) United States Patent
Tatewaki et al.

(10) Patent No.: US 9,284,910 B2
(45) Date of Patent: Mar. 15, 2016

(54) VEHICLE CONTROL DEVICE AND VEHICLE CONTROL METHOD

(71) Applicant: JATCO LTD, Fuji-shi, Shizuoka (JP)

(72) Inventors: Keichi Tatewaki, Atsugi (JP); Masayuki Miyazono, Isehara (JP); Hideshi Wakayama, Hadano (JP)

(73) Assignee: JATCO LTD, Fuji-Shi (JP)

( * ) Notice: Subject to any disclaimer, the term of this patent is extended or adjusted under 35 U.S.C. 154(b) by 613 days.

(21) Appl. No.: 13/693,789

(22) Filed: Dec. 4, 2012

(65) Prior Publication Data

US 2013/0151129 A1 Jun. 13, 2013

(30) Foreign Application Priority Data

Dec. 9, 2011 (JP) ................................. 2011-269850

(51) Int. Cl.
*F02N 11/08* (2006.01)
*F02D 45/00* (2006.01)
*B60W 10/06* (2006.01)
*B60W 10/107* (2012.01)
*B60W 30/18* (2012.01)
*F16H 61/00* (2006.01)
(Continued)

(52) U.S. Cl.
CPC ............... *F02D 45/00* (2013.01); *B60W 10/06* (2013.01); *B60W 10/107* (2013.01); *B60W 30/18072* (2013.01); *F02N 11/0844* (2013.01); *F02N 11/0848* (2013.01); *F16H 61/0025* (2013.01); *B60W 2510/0638* (2013.01); *B60W 2510/108* (2013.01); *B60Y 2300/18016* (2013.01); *B60Y 2300/46* (2013.01); *F02D 41/042* (2013.01); *F02N 2200/022* (2013.01); *F02N 2200/0802* (2013.01); *F16H 2059/683* (2013.01)

(58) Field of Classification Search
CPC ............ F02N 11/0814; F02N 11/0818; F02N 11/0822; F02N 11/0825
USPC ...................... 123/179.4, 179.3; 701/112, 113
See application file for complete search history.

(56) References Cited

U.S. PATENT DOCUMENTS 6,275,759 B1 * 8/2001 Nakajima et al. ................ 701/54
6,799,109 B2 9/2004 Nakamori et al.
(Continued)

FOREIGN PATENT DOCUMENTS

JP 11-351371 A 12/1999
JP 2000-170568 A 6/2000
(Continued)

*Primary Examiner* — Hai Huynh
*Assistant Examiner* — Raza Najmuddin
(74) *Attorney, Agent, or Firm* — Foley & Lardner LLP (57) ABSTRACT

A vehicle control device for controlling a vehicle includes a drive source control unit adapted to output a command for automatically stopping a drive source when a first predetermined condition is satisfied and output a command for restarting the drive source when a second predetermined condition is not satisfied after the command for automatically stopping the drive source is output, a drive source restart determination unit adapted to determine that the drive source has restarted when a third predetermined condition is satisfied after the command for restarting the drive source is output, and a restart determination prohibition unit adapted to prohibit a restart determination by the drive source restart determination unit at least until the third predetermined condition is no longer satisfied when the third predetermined condition is satisfied and the command for restarting the drive source is output.

13 Claims, 7 Drawing Sheets

(51) Int. Cl.
*F16H 59/68* (2006.01)
*F02D 41/04* (2006.01)

(56) References Cited

U.S. PATENT DOCUMENTS

| | | | |
|---|---|---|---|
| 6,947,827 B2* | 9/2005 | Fuse et al. | 701/110 |
| 8,577,582 B2* | 11/2013 | Yu et al. | 701/112 |
| 2003/0041830 A1 | 3/2003 | Sugiura et al. | |
| 2003/0089326 A1 | 5/2003 | Ujifusa | |
| 2003/0171867 A1 | 9/2003 | Nakamori et al. | |
| 2004/0214689 A1* | 10/2004 | Kaneko | 477/203 |
| 2010/0174473 A1* | 7/2010 | Pursifull et al. | 701/112 |
| 2011/0071740 A1 | 3/2011 | Nihei et al. | |
| 2011/0129356 A1 | 6/2011 | Kobayashi et al. | |
| 2012/0138006 A1* | 6/2012 | Gwon et al. | 123/179.4 |

FOREIGN PATENT DOCUMENTS

| | | |
|---|---|---|
| JP | 2003-240110 A | 8/2003 |
| JP | 2007-211713 A | 8/2007 |
| JP | 2010-248998 A | 11/2010 |
| JP | 2011-196501 A | 10/2011 |

* cited by examiner

VEHICLE CONTROL DEVICE AND VEHICLE CONTROL METHOD

FIELD OF THE INVENTION

The present invention relates to a vehicle control device and a vehicle control method.

BACKGROUND OF THE INVENTION

JP2010-248998A discloses a control device which automatically stops an engine when a predetermined stop condition holds and restarts the engine when the stop condition no longer holds thereafter.

In JP2010-248998A, the engine is determined to have restarted when the stop condition no longer holds and an engine rotation speed exceeds a restart completion determination value.

SUMMARY OF THE INVENTION

However, if the stop condition no longer holds immediately after the stop condition holds, the engine rotation speed may be above the restart completion determination value.

The above invention has a problem that it is erroneously determined in such a case that the engine has restarted even during the automatic stop of the engine since the engine rotation speed is erroneously determined to be above the restart completion determination value.

The present invention was developed to solve such a problem and aims to prevent an erroneous determination that an engine has started when the engine is not restarted yet.

One aspect of the present invention is directed to a vehicle control device for controlling a vehicle including a transmission to which a torque is transmitted from a drive source, including a drive source control unit adapted to output a command for automatically stopping the drive source when a first predetermined condition is satisfied and outputs a command for restarting the drive source when a second predetermined condition is not satisfied after the command for automatically stopping the drive source is output; a drive source restart determination unit adapted to determine that the drive source has restarted when a third predetermined condition is satisfied after the command for restarting the drive source is output; and a restart determination prohibition unit adapted to prohibit a restart determination by the drive source restart determination unit at least until the third predetermined condition is no longer satisfied when the third predetermined condition is satisfied and the command for restarting the drive source is output.

Another aspect of the present invention is directed to a vehicle control method for controlling a vehicle including a transmission to which a torque is transmitted from a drive source, including outputting a command for automatically stopping the drive source when a first predetermined condition is satisfied and outputting a command for restarting the drive source when a second predetermined condition is not satisfied after the command for automatically stopping the drive source is output; determining that the drive source has restarted when a third predetermined condition is satisfied after the command for restarting the drive source is output; and prohibiting a determination at least until the third predetermined condition is no longer satisfied when the third predetermined condition is satisfied and the command for restarting the drive source is output.

According to these aspects, in restarting the drive force, an erroneous determination on the restart of the drive source can be prevented by prohibiting the restart determination of the drive source until the third predetermined condition is no longer satisfied.

DESCRIPTION OF THE PREFERRED EMBODIMENTS

Hereinafter, a first embodiment of the present invention is described with reference to the accompanying drawings. It should be noted that, in the following description, a "speed ratio" of a certain transmission is a value obtained by dividing an input rotation speed of this transmission by an output rotation speed thereof. Further, a "lowest speed ratio" is a maximum speed ratio of this transmission used such as at the time of starting a vehicle. A "highest speed ratio" is a minimum speed ratio of this transmission.

Figure 1:
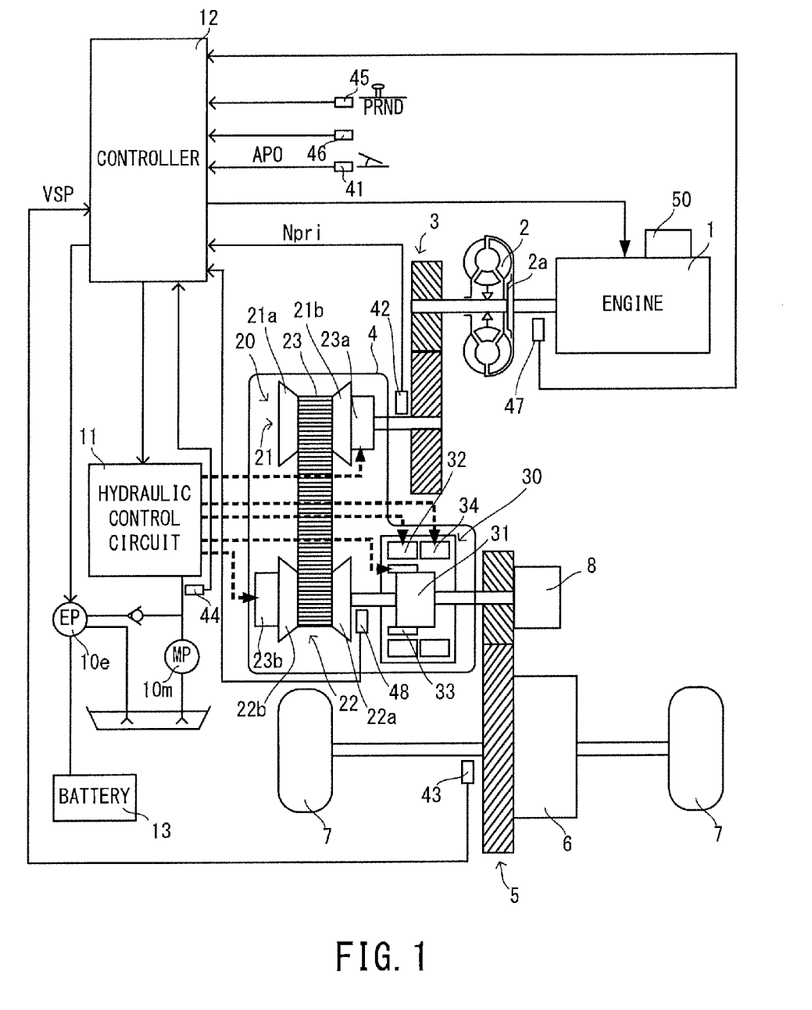
FIG. 1 is a schematic configuration diagram of a coast stop vehicle according to a first embodiment.

FIG. 1 is a schematic configuration diagram of a coast stop vehicle according to the first embodiment of the present invention. This vehicle includes an engine 1 as a drive source, and an output rotation of the engine 1 is transmitted to drive wheels 7 via a torque converter 2 with a lock-up clutch 2a, a first gear train 3, a continuously variable transmission (hereinafter, merely referred to as a "transmission 4"), a second gear train 5 and a differential gear unit 6. The second gear train 5 includes a parking mechanism 8 for mechanically locking an output shaft of the transmission 4 when parked so as not to be able to rotate. The vehicle includes a starter 50 for starting the engine 1 by rotating a crankshaft of the engine 1.

The transmission 4 includes a mechanical oil pump 10m to which the rotation of the engine 1 is input and which is driven by utilizing a part of power of the engine 1, and an electrical oil pump 10e which is driven upon receiving the supply of power from a battery 13. The electrical oil pump 10e is composed of an oil pump main body, an electric motor and a motor driver for driving and rotating the oil pump main body, and can control an operating load to an arbitrary load or in multiple steps. Further, the transmission 4 includes a hydraulic control circuit 11 for adjusting a hydraulic pressure (hereinafter, referred to as a "line pressure") from the mechanical oil pump 10m or the electrical oil pump 10e and supplying the adjusted hydraulic pressure to each component of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to an upstream side (input shaft side) of the variator 20.

The variator 20 includes a primary pulley 21, a secondary pulley 22 and a V-belt 23 mounted across and wound around the pulleys 21 and 22. Each of the pulleys 21, 22 includes a fixed conical plate 21a, 22a, a movable conical plate 21b, 22b arranged with a sheave surface faced toward the fixed conical plate 21a, 22a and forming a V-groove between the fixed conical plate 21a, 22a and the movable conical plate 21b, 22b and a hydraulic cylinder 23a, 23b provided on the back surface of the movable conical plate 21b, 22b for displacing the movable conical plate 21b, 22b in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of a hydraulic pressure to each frictional engagement element 32 to 34 is adjusted to change engaged and released states of each frictional engagement element 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed as "the transmission 4 is in a low-speed mode" and a case where the sub-transmission mechanism 30 is in the second gear position is expressed as "the transmission 4 is in a high-speed mode".

Each of the frictional engagement elements is provided on an upstream side or a downstream side of the variator 20 on the power transmission path and any of them enables power transmission of the transmission 4 when being engaged, while disabling power transmission of the transmission 4 when being released.

Figure 2:
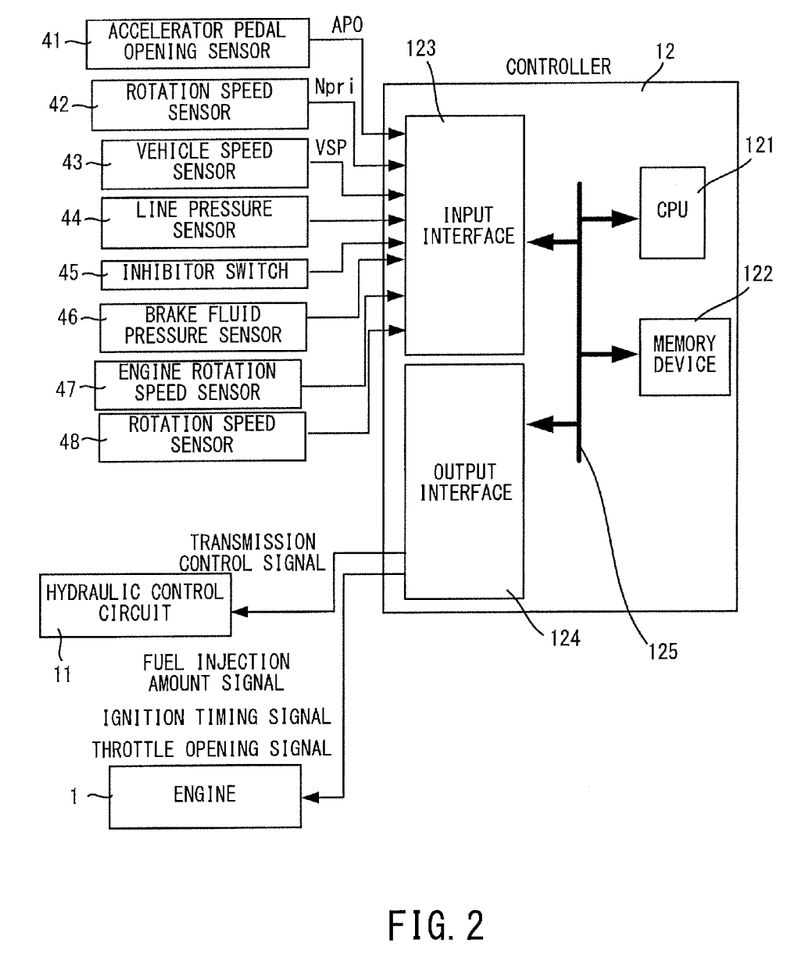
FIG. 2 is a schematic configuration diagram of a controller of the first embodiment.

A controller 12 is for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a rotation speed sensor 48 for detecting an output rotation speed of the transmission 4 (=rotation speed of the secondary pulley 22, hereinafter, referred to as a "secondary rotation speed Nsec"), an output signal of a vehicle speed sensor 43 for detecting a vehicle speed VSP, an output signal of a line pressure sensor 44 for detecting a line pressure, an output signal of an inhibitor switch 45 for detecting the position of a select lever, an output signal of a brake fluid pressure sensor 46 for detecting a brake fluid pressure, an output signal of an engine rotation speed sensor 47 for detecting a rotation speed of the crankshaft of the engine 1 and the like output signals.

A control program of the engine 1, a transmission control program of the transmission 4, and various maps and tables used in these programs are stored in the memory device 122. The CPU 121 reads the program stored in the memory device 122 and executes it, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and the motor driver of the electrical oil pump 10e via the output interface 124. Various values used in the computations by the CPU 121 and the results of these computations are appropriately stored in the memory device 122.

The hydraulic control circuit 11 includes a plurality of flow passages and a plurality of hydraulic control valves. In accordance with a transmission control signal from the controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e, and supplies this hydraulic pressure to each portion of the transmission 4. In this way, the speed ratio of the variator 20 and the gear position of the sub-transmission mechanism 30 are changed to shift the transmission 4.

Figure 3:
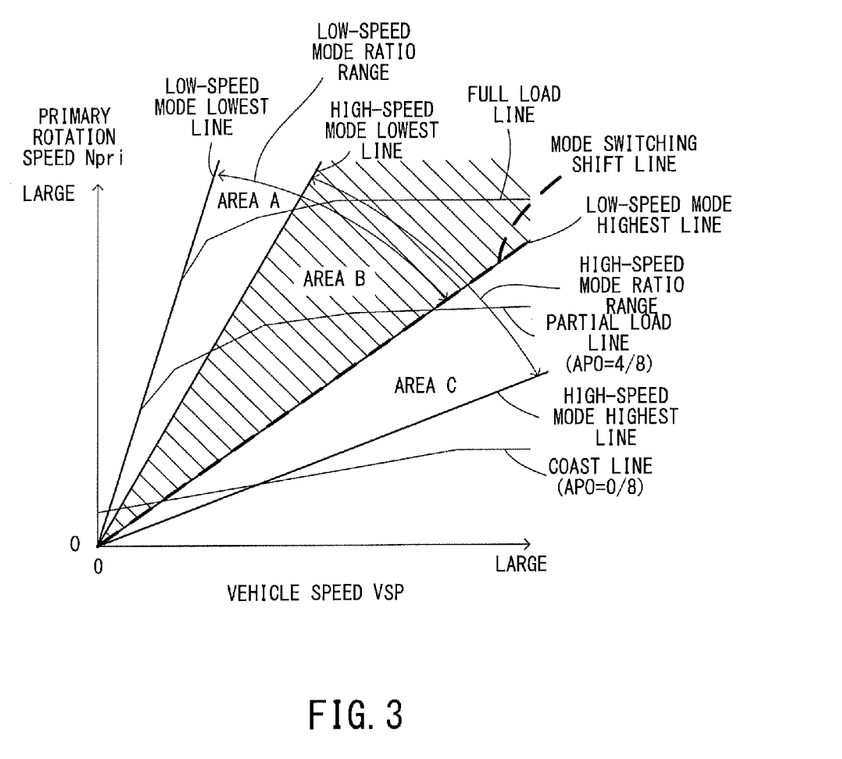
FIG. 3 is an example of a shift map of the first embodiment.

FIG. 3 shows an example of the shift map stored in the memory device 122. The controller 12 controls the variator 20 and the sub-transmission mechanism 30 in accordance with an operating state of the vehicle (vehicle speed VSP, primary rotation speed Npri, secondary rotation speed Nsec, and accelerator pedal opening APO in this embodiment) based on this shift map.

In this shift map, an operating point of the transmission 4 is determined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying a speed ratio of the variator 20 by a speed ratio of the sub-transmission mechanism 30, hereinafter, referred to as a "through speed ratio"). In this shift map, a shift line is set for each accelerator pedal opening APO similarly to a shift map of a conventional V-belt continuously variable transmission, and the transmission 4 is shifted in accordance with the shift line selected based on the accelerator pedal opening APO. It should be noted that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 at the lowest speed ratio and a low-speed mode highest line obtained by setting the speed ratio of the variator 20 at the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 at the lowest speed ratio and a high-speed mode highest line obtained by setting the speed ratio of the variator 20 at the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). Thus, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line which shifts the sub-transmission mechanism 30 is set to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock at the time of shifting the sub-transmission mechanism 30 is suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 is changed. At this time, an inertia phase in which the speed ratio of the sub-transmission mechanism 30 actually changes and a period during which the speed ratio of the variator 20 changes are synchronized. The speed ratio of the variator 20 is changed in the direction opposite to the direction in which the speed ratio of the sub-transmission mechanism 30 is changed to prevent a change in the input rotation caused by a step in the actual through speed ratio Ratio from giving a sense of incongruity to a driver.

Specifically, when the actual through speed ratio Ratio of the transmission 4 changes from a low side to a high side over the mode switch speed ratio mRatio, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes from the high side to the low side over the mode switch speed ratio mRatio, the controller 12 changes the gear position of the sub-transmission mechanism 30 from the second gear position to the first gear position (2-1 shift) and changes the speed ratio of the variator 20 to the high side.

Further, the controller 12 performs a coast stop control described below to suppress a fuel consumption amount.

The coast stop control is a control for suppressing the fuel consumption amount by automatically stopping the engine 1 (coast stop) during the travel of the vehicle in a low speed range. The coast stop control is common to a fuel-cut control performed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch 2a.

Upon performing the coast stop control, the controller 12 first judges, for example, conditions (first predetermined condition) a to c listed below and the like. These conditions are, in other words, conditions for judging whether or not a driver has an intention to stop the vehicle.

a: accelerator pedal is not stepped on at all (accelerator position APO=0)
b: brake pedal is stepped on (brake fluid pressure is not lower than a predetermined value)
c: vehicle speed is a predetermined low speed (e.g. 9 km/h) or lower When all of these coast stop conditions are satisfied, the controller 12 performs the coast stop control by outputting a signal for automatically stopping the engine 1 and stopping fuel injection into the engine 1. On the other hand, if any one of the above coast stop conditions (second predetermined condition) is no longer satisfied, the controller 12 finishes the coast stop control by outputting a signal for restarting the engine 1 and resuming fuel injection into the engine 1. It should be noted that conditions for starting the coast stop control and those for finishing the coast stop control may be different.

The engine 1 is restarted by rotating the crankshaft by the starter 50. It should be noted that the engine 1 cannot be restarted until the engine rotation speed reaches a rotation speed at which the crankshaft can be rotated by the starter 50. Thus, even if any one of the coast stop conditions is no longer satisfied in a state where the engine rotation speed is relatively high, the engine 1 is not restarted until the engine rotation speed is reduced to the rotation speed at which the crankshaft can be rotated by the starter 50.

Figure 4:
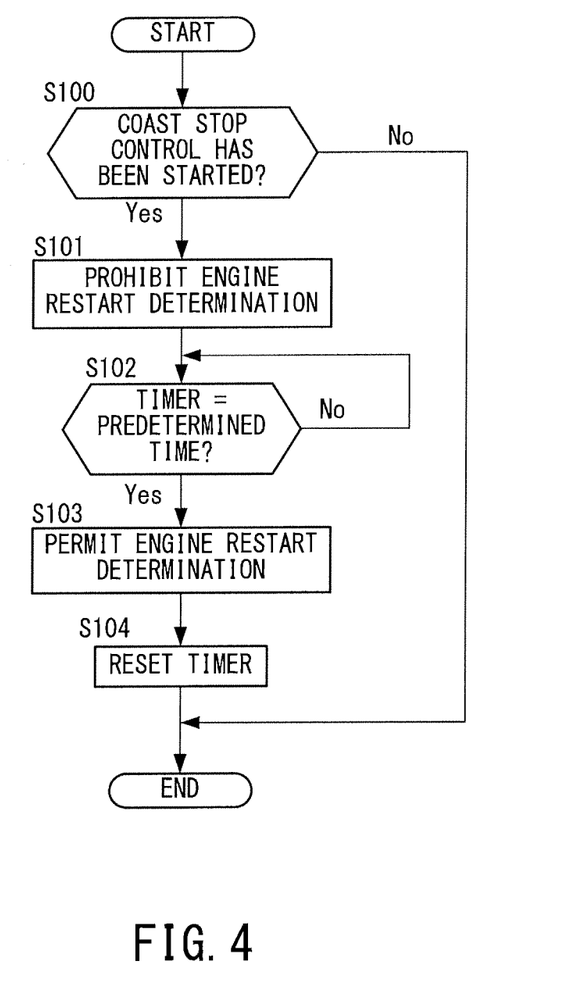
FIG. 4 is a flow chart showing an engine restart determination control of the first embodiment.

Next, an engine restart determination control in the coast stop control of this embodiment is described with reference to a flow chart of FIG. 4.

In Step S100, the controller 12 determines whether or not the coast stop control has been started. The controller 12 proceeds to Step S101 if the coast stop control has been started, while it finishes this control unless the coast stop control has been started.

When the coast stop control is started, the controller 12 performs a protection control such as a torque-down control in preparation for the restart of the engine 1. Since the engine 1 automatically stops and the hydraulic pressure supplied from the mechanical oil pump 10m is reduced or becomes zero during the coast stop control, the electrical oil pump 10e is started and the line pressure and the like are supplied by the electrical oil pump 10e. A maximum discharge pressure of the electrical oil pump 10e is lower than that of the mechanical oil pump 10m and the line pressure and the like also become lower. Thus, a torque capacity of the variator 20 is small.

When the engine 1 restarts and the engine rotation speed becomes higher, the discharge pressure of the mechanical oil pump 10m becomes higher and the torque capacity of the variator 20 also becomes larger.

However, if a large torque is input from the engine 1 to the variator 20 before the engine 1 restarts and the torque capacity of the variator 20 becomes sufficiently large, belt slippage, for example, occurs in the variator 20 and the variator 20 may be deteriorated. Thus, if the coast stop control is performed, the protection control such as the torque-down control is performed until the engine 1 restarts, the discharge pressure of the mechanical oil pump 10m becomes sufficiently high and the torque capacity becomes sufficiently large thereafter.

In Step S101, the controller 12 prohibits an engine restart determination by operating a timer for prohibiting the engine restart determination. If the line pressure is not lower than a predetermined hydraulic pressure (third predetermined condition), the engine 1 is determined to have restarted. That is, the controller 12 prohibits a determination as to whether or not the line pressure based on a signal from the line pressure sensor 44 is not lower than the predetermined hydraulic pressure. The predetermined hydraulic pressure is a pressure at which the torque capacity of the variator 20 is sufficiently large so that belt slippage does not occur in the variator 20 even if the protection control such as the torque-down control is finished, and which is set by an experiment or the like. The timer has an initial value of zero and returns to the initial value when the timer is reset.

Such as when the engine rotation speed is suddenly reduced from a high state or when a return control to the low side is performed in the variator 20, even if the coast stop control is started, the line pressure is relatively high immediately thereafter. Thus, if the engine restart determination is made based on the signal from the line pressure sensor 44 immediately after the coast stop control is started, the engine 1 may be erroneously determined to have restarted due to a high line pressure even if the engine 1 has not restarted yet (e.g. while the engine rotation speed is reduced toward zero or in a state where the engine rotation speed is zero). Thus, the engine restart determination is prohibited here by operating the timer after the coast stop control is started.

The controller 12 prohibits the engine restart determination while the timer is operating even if any one of the coast stop conditions is no longer satisfied.

In Step S102, the controller 12 determines whether or not the timer has reached a predetermined time. The predetermined time is a time when engine restart is not erroneously determined, i.e. a time when at least the line pressure is lower than the predetermined hydraulic pressure after the coast stop control is started, and which is set by an experiment or the like. The controller 12 proceeds to Step S103 if the timer has reached the predetermined time.

In Step S103, the controller 12 permits the engine restart determination.

In Step S104, the controller 12 resets the timer.

If the restart of the engine 1 is confirmed by the engine restart determination, the controller 12 stops the protection control such as the torque-down control and transitions to a normal control.

Figure 5:
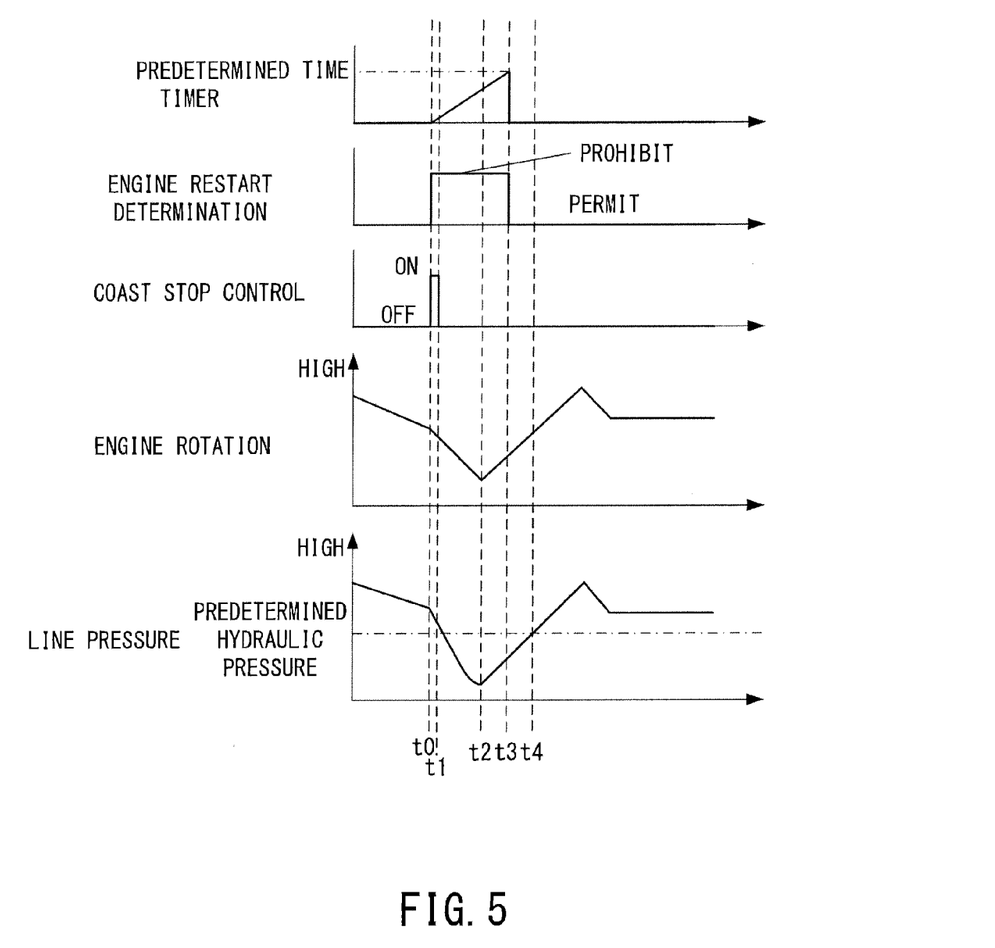
FIG. 5 is a time chart when the engine restart determination control of the first embodiment is performed.

Next, the engine restart determination control of this embodiment is described using a time chart of FIG. 5.

When all of the coast stop conditions are satisfied at time t0, the coast stop control is started, the engine restart determination is prohibited and the timer is operated. Further, the protection control such as the torque-down control is performed.

If any one of the coast stop conditions is no longer satisfied at time t1, the coast stop control is finished. However, the engine restart determination is still prohibited since the timer has not reached the predetermined time yet. Further, the engine 1 is not restarted until the engine rotation speed is reduced to the rotation speed at which the crankshaft can be rotated by the starter 50.

Since the line pressure is higher than the predetermined hydraulic pressure at time t1 in the case of not using this embodiment, the engine 1 is erroneously determined to have restarted. Thus, the protection control such as the torque-down control is stopped and a transition is made to the normal control although the engine 1 has not actually restarted yet. Thereafter, when the engine 1 actually restarts, a torque input to the variator 20 largely varies since the protection control such as the torque-down control has not been performed although the torque capacity of the variator 20 is not sufficiently large. This causes belt slippage or the like in the variator 20 and the variator 20 may be deteriorated.

In the case of using this embodiment, the engine restart determination is prohibited and such an erroneous determination and the deterioration of the variator 20 can be suppressed.

When the rotation speed of the engine 1 reaches the rotation speed at which the crankshaft can be rotated by the starter 50 at time t2, the engine 1 is restarted by the starter 50.

When the timer reaches the predetermined time at time t3, the engine restart determination is permitted.

When the line pressure reaches the predetermined hydraulic pressure at time t4, the engine 1 is determined to have restarted. Further, the protection control such as the torque-down control is stopped and a transition is made to the normal control.

Effects of the first embodiment of the present invention are described.

The engine restart determination is prohibited until the line pressure becomes at least less than the predetermined hydraulic pressure after the coast stop control is started. This can prevent that, in the vehicle in which the engine restart determination is made based on the line pressure, the restart determination of the engine 1 is made before the line pressure becomes less than the predetermined hydraulic pressure such as immediately after the coast stop control is started and the engine 1 is erroneously determined to have restarted although the engine 1 has not actually restarted yet.

When the coast stop control is performed, the protection control such as the torque-down control is performed in preparation for the restart of the engine 1. The protection control is performed so that the variator 20 and the like are not deteriorated due to a variation of a torque input to the variator 20 and the like when the engine 1 restarts. When the torque capacity becomes sufficiently large so as not to deteriorate the variator 20 and the like, the protection control is finished and a transition is made to the normal control. In the case of not using this embodiment, the engine 1 may be erroneously determined to have restarted, for example, immediately after the coast stop control is started and a transition may be made from the protection control to the normal control although the engine 1 has not restarted yet and the torque capacity of the variator 20 is not sufficiently large. If the engine 1 actually restarts thereafter, a torque may be transmitted from the engine 1 to the variator 20 in a state where the torque capacity of the variator 20 is not sufficiently large and the protection control is not performed. This may lead to the deterioration of the variator 20.

In this embodiment, the deterioration of the variator 20 and the like can be suppressed by preventing an erroneous determination on the restart of the engine 1.

When the coast stop control is started, the timer is operated and the restart determination of the engine 1 is prohibited during the predetermined time until the hydraulic pressure becomes less than the predetermined hydraulic pressure. In this way, an erroneous determination on the restart of the engine 1 can be prevented by an easy control.

The predetermined time of the above embodiment may be set based on the engine rotation speed when the coast stop control is started. In this case, the higher the engine rotation speed when the coast stop control is started, the longer the predetermined time. Thus, the restart determination of the engine 1 can be made in accordance with an operating condition of the vehicle and an erroneous determination on the restart of the engine 1 can be further prevented.

Next, a second embodiment of the present invention is described.

The second embodiment differs from the first embodiment in the engine restart determination control in the coast stop control.

Figure 6:
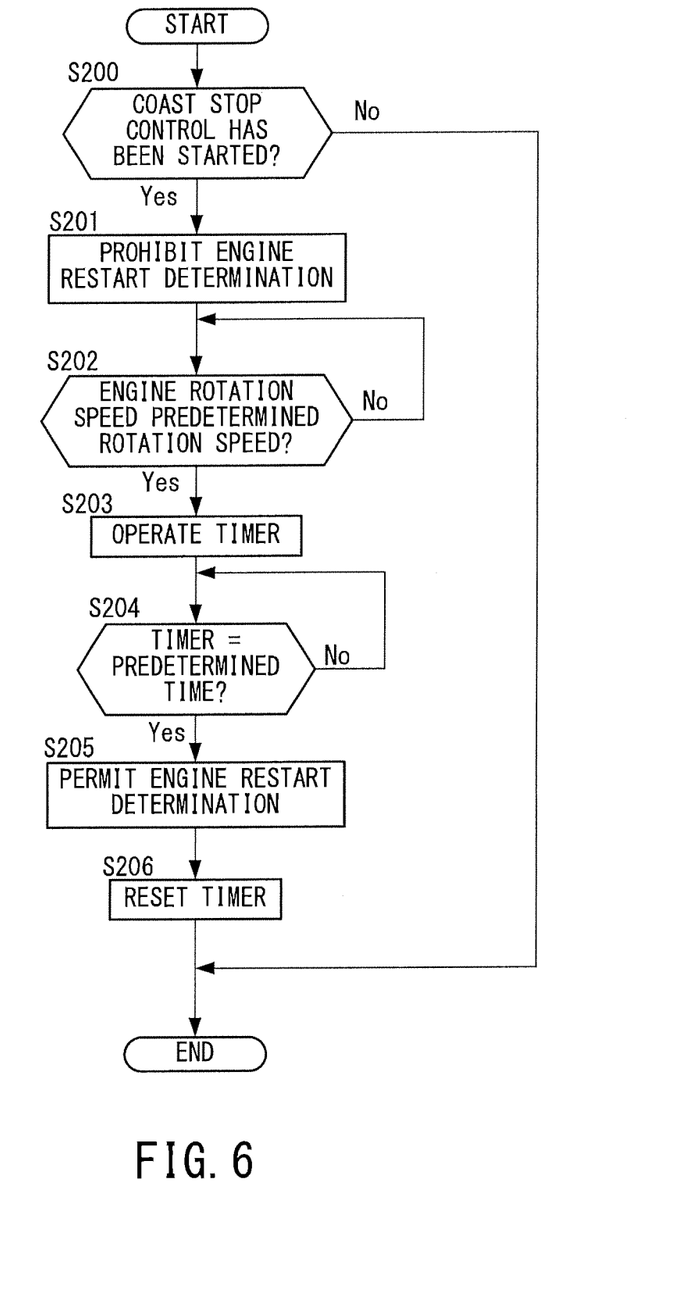
FIG. 6 is a flow chart showing an engine restart determination control of a second embodiment.

The engine restart determination control in the coast stop control of this embodiment is described using a flow chart of FIG. 6.

In Step S200, the controller 12 determines whether or not the coast stop control has been started. The controller 12 proceeds to Step S201 if the coast stop control has been started while it finishes this control unless the coast stop control has been started.

In Step S201, the controller prohibits the engine restart determination.

In Step S202, the controller 12 detects the engine rotation speed based on a signal from the engine rotation speed sensor 47 and determines whether or not the engine rotation speed is lower than a predetermined rotation speed. The controller 12 proceeds to Step S203 if the engine rotation speed is lower than a predetermined rotation speed. The predetermined rotation speed is a rotation speed which is set in advance and invariably passed when the coast stop control is performed and can be accurately detected by the engine rotation speed sensor 47. Further, the predetermined rotation speed is a rotation speed higher than the rotation speed at which the crankshaft can be rotated by the starter 50. Although the predetermined rotation speed is an idle rotation speed of the engine 1 in this embodiment, it is not limited to this.

If the predetermined rotation speed is set to be excessively high, the engine rotation speed detected by the engine rotation speed sensor 47 largely varies, whereby the accuracy of a timer operation start timing is degraded and the engine restart determination may be made and the restart of the engine 1 may be erroneously determined despite an operating state where the engine restart determination is supposed to be prohibited. On the other hand, if the predetermined rotation speed is set to be excessively low, detection accuracy by the engine rotation speed sensor 47 may be degraded, the accuracy of the restart determination of the engine 1 may be degraded and the restart of the engine 1 may be erroneously determined. Further, if the predetermined rotation speed is lower than the rotation speed at which the crankshaft can be rotated by the starter 50, the timer cannot be operated, a return from the protection control cannot be made and driving performance may be degraded. In consideration of these points, the predetermined rotation speed is set.

In Step S203, the controller 12 operates the timer. Here, the controller 12 measures a time after the engine rotation speed reaches the predetermined rotation speed. The timer has an initial value of zero and it returns to the initial value when the timer is reset.

In Step S204, the controller 12 determines whether or not the timer has reached a predetermined time. The controller 12 proceeds to Step S205 if the timer has reached the predetermined time. The predetermined time is a time required until the crankshaft can be rotated by the starter 50 after the engine rotation speed reaches the predetermined rotation speed, and is set in advance.

In Step S205, the controller 12 permits the engine restart determination.

In Step S206, the controller 12 resets the timer.

Figure 7:
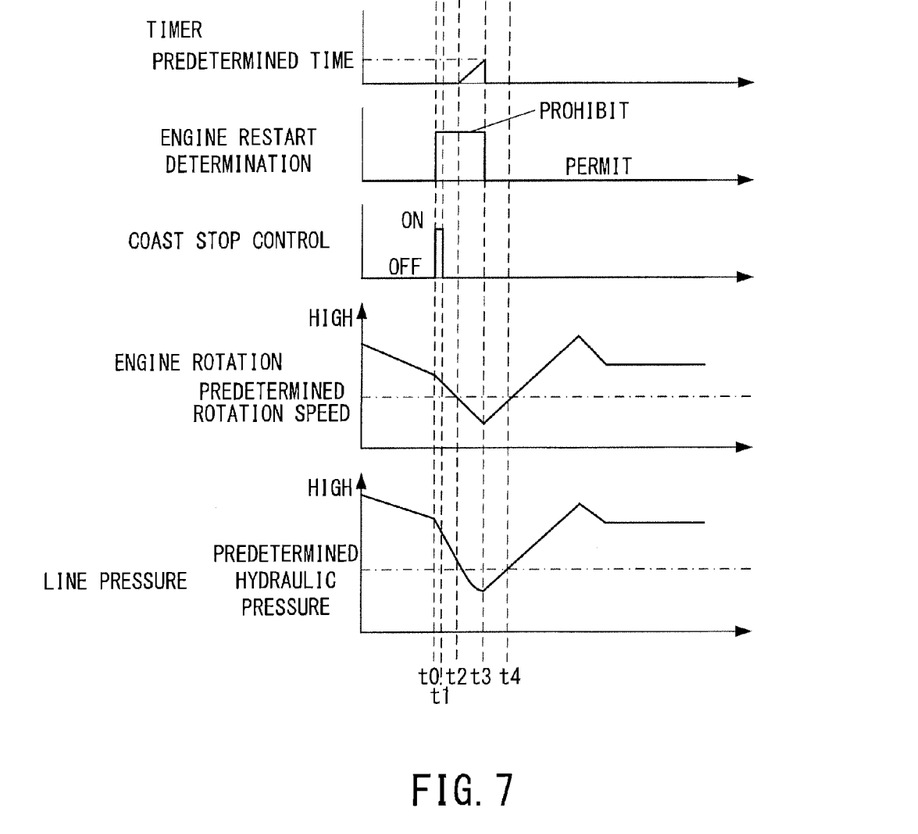
FIG. 7 is a time chart when the engine restart determination control of the second embodiment is performed.

Next, the engine restart determination control of this embodiment is described using a time chart of FIG. 7.

When all of the coast stop conditions are satisfied at time t0, the coast stop control is started and the engine restart determination is prohibited. Further, a protection control such as a torque-down control is performed.

If any one of the coast stop conditions is no longer satisfied at time t1, the coast stop control is finished. The engine 1 is not restarted until the engine rotation speed is reduced to the rotation speed at which the crankshaft can be rotated by the starter 50.

When the engine rotation speed reaches the predetermined rotation speed at time t2, the timer is operated. The engine restart determination is still prohibited.

When the timer reaches the predetermined time and the rotation speed of the engine 1 reaches the rotation speed at which the crankshaft can be rotated by the starter 50 at time t3, the restart of the engine 1 is permitted and the engine 1 restarts.

When the line pressure reaches the predetermined hydraulic pressure at time t4, the engine 1 is determined to have restarted.

Effects of the second embodiment of the present invention are described.

The engine restart determination is prohibited until the engine rotation speed reaches the predetermined rotation speed after the coast stop control is started. Further, when the engine rotation speed reaches the predetermined rotation speed after the coast stop control is started, the timer is operated and the engine restart determination is prohibited for the predetermined time. Thus, the engine rotation speed at which the timer is operated is constant even if the engine rotation speed when the coast stop control is started differs, i.e. even if the operating state when the coast stop control is started differs. Therefore, the influence of the engine restart determination due to a variation in the operating state when the coast stop control is started can be reduced and an erroneous determination on the restart of the engine 1 can be prevented.

If the predetermined rotation speed is set to be excessively high, the detected engine rotation speed largely varies, whereby the accuracy of a timer operation start timing may be degraded, and the timer may be operated when the engine rotation speed is not lower than the predetermined rotation speed, for example, due to a variation of the engine rotation speed, and the engine restart determination may be made and the restart of the engine 1 may be erroneously determined despite an operating state where the engine restart determination is supposed to be prohibited. On the other hand, if the predetermined rotation speed is set to be excessively low, detection accuracy by the engine rotation speed sensor 47 may be degraded, the accuracy of the restart determination of the engine 1 may be degraded and the restart of the engine 1 may be erroneously determined. Further, if the predetermined rotation speed is lower than the rotation speed at which the crankshaft can be rotated by the starter 50, the timer cannot be operated, a state where the engine restart determination is prohibited continues and a return from the protection control cannot be made for a long time, whereby driving performance (particularly, restartability) may be deteriorated. In this embodiment, an erroneous determination on the restart of the engine 1 is prevented and the deterioration of driving performance can be prevented by setting the predetermined rotation speed to the idle rotation speed.

If the predetermined time is short, the engine restart determination may be made upon the completion of the timer and the restart of the engine 1 may be erroneously determined if the hydraulic pressure is higher than the predetermined hydraulic pressure due to a measurement error. On the other hand, if the predetermined time is long, driving performance may be deteriorated since the engine restart determination is prohibited and the protection control is continued even when the engine 1 restarts and the hydraulic pressure is not lower than the predetermined hydraulic pressure. In this embodiment, the restart of the engine 1 can be accurately determined and the deterioration of driving performance can be prevented by setting the predetermined time at the time after which the engine 1 can be started by rotating the crankshaft by the starter 50.

If the predetermined time of the first embodiment and that of the second embodiment are compared, the predetermined time of the second embodiment is longer. To increase the line pressure to or above the predetermined hydraulic pressure after the line pressure becomes lower than the predetermined hydraulic pressure and an erroneous determination on the engine restart is suppressed by the elapse of the predetermined time in the first embodiment, the engine 1 needs to be restarted. Specifically, there is no problem in prohibiting the restart of the engine 1 until the engine rotation speed reaches the rotation speed at which the engine 1 can be restarted by the starter 50, which is one judgment criterion for restarting the engine 1, after the elapse of the predetermined time of the first embodiment. Thus, in the second embodiment, the engine restart determination prohibition time can be set to be long and an erroneous determination on the engine restart can be further suppressed by setting the predetermined time at the time until the crankshaft can be rotated by the starter 50, i.e. at the time until the engine 1 can be restarted.

It goes without saying that the present invention is not limited to the above embodiments and includes various possible modifications and improvements within the scope of the technical concept thereof.

Although the restart determination of the engine is made based on the hydraulic pressure in the above embodiments, it is also conceivable to alternatively make this determination based on the engine rotation speed. However, since the engine rotation speed largely varies, a filtering process is performed to reduce a variation. Thus, the engine rotation speed after the filtering process is represented by a signal delayed with respect to an actual engine rotation speed. Thus, if the engine rotation speed is used, the restart determination of the engine 1 is delayed, which is problematic. In the above embodiments, such a delay can be suppressed by making the restart determination of the engine 1 based on the hydraulic pressure.

Although the predetermined rotation speed is set at the idle rotation speed of the engine 1 as an example in the second embodiment, it is desirably set at a minimum value of the idle rotation speed to realize this embodiment more accurately. This can extend the time until the timer is operated after the start of the coast stop control and accuracy can be improved by suppressing a variation. The engine rotation speed varies, and even during idling, the engine rotation speed slightly oscillates. The minimum value of the idle rotation speed is a minimum rotation speed of the oscillating engine rotation speed.

Although the coast stop control is described as an example in the above embodiments, the above control may be used in the case of performing an idle stop control for automatically stopping the engine 1 during the stop of the vehicle.

The transmission 4 may be a step transmission or a continuously variable transmission including no sub-transmission mechanism 30. Further, the vehicle may not include the electrical oil pump 10e.

Although the above control is performed based on the line pressure, it may be performed based on a primary pulley pressure or a secondary pulley pressure. Further, the control may be performed based on the engine rotation speed or the like instead of based on the hydraulic pressure.

Although the predetermined time is a time required until the crankshaft can be rotated by the starter 50 in the second embodiment, it may be, for example, a time required to start the engine. Even if the engine rotation speed has reached the rotation speed at which the crankshaft can be rotated by the starter 50, an actual hydraulic pressure has not increased yet and the hydraulic pressure increases by starting the engine 1. Accordingly, the predetermined time is not limited to the predetermined time of the second embodiment and may be, for example, a time required to start the engine. This can make the predetermined time even longer, set a longer engine restart determination prohibition time and further suppress an erroneous determination of the engine restart.

In the second embodiment, the predetermined time may be a time until the hydraulic pressure becomes less than the predetermined hydraulic pressure after the engine rotation speed reaches the predetermined rotation speed. This can shorten a time until the restart of the engine 1 is determined even if the coast stop control is stopped, and driving performance can be improved.

An erroneous determination in the engine restart determination tends to occur when a parameter for determining the completion of the restart is the engine rotation speed, for example, when a threshold value is set at a relatively low rotation speed such as a rotation speed below the idle rotation speed. In such a case, the engine rotation speed becomes higher than the threshold value in starting the coast stop control and the restart of the engine is erroneously determined to have been completed immediately after the coast stop control is started. The engine rotation speed does not become zero, but gradually decreases immediately after the coast stop control is started. Further, the engine rotation speed is a value for which the filtering process is performed as an anti-noise measure and which is delayed with respect to the actual engine rotation speed. Thus, a state where the engine rotation speed is higher than the threshold value can occur immediately after the coast stop control is started. Further, the same holds for the case where the engine restart determination is made based on the hydraulic pressure. A state where the hydraulic pressure is higher than a threshold value for determining the restart of the engine immediately after the coast stop control is started occurs such as when the hydraulic pressure is temporarily set high for a return to the low side before the coast stop control is started or when the hydraulic pressure becomes temporarily high due to an insufficient amount of lubricant, an instruction to engage a friction element, the securement of a pulley gripping pressure and the like in starting the coast stop control. In the present invention, an erroneous determination on the engine restart can be suppressed also in such a situation.

This application claims priority from Japanese Patent Application No. 2011-269850, filed Dec. 9, 2011, which is incorporated herein by reference in its entirety.

What is claimed is:

1. A vehicle control device for controlling a vehicle including a transmission to which a torque is transmitted from a drive source, comprising:

a drive source control unit adapted to output a command for automatically stopping the drive source when a first predetermined condition is satisfied and to output a command for restarting the drive source when a second predetermined condition is not satisfied after the command for automatically stopping the drive source is output;

a drive source restart determination unit adapted to determine that the drive source has restarted when a third predetermined condition is satisfied after the command for restarting the drive source is output;

a restart determination prohibition unit adapted to prohibit a restart determination by the drive source restart determination unit at least until the third predetermined condition is no longer satisfied when the third predetermined condition is satisfied and the command for restarting the drive source is output, a hydraulic pressure supply unit adapted to be driven by the drive source and to supply a hydraulic pressure to the transmission; and a hydraulic pressure detection unit adapted to detect the hydraulic pressure supplied by the hydraulic pressure supply unit, wherein the drive source restart determination unit is adapted to determine that the drive source has restarted, assuming that the third predetermined condition has been satisfied, when the hydraulic pressure detected by the hydraulic pressure detection unit becomes equal to or higher than a predetermined hydraulic pressure; and wherein the restart determination prohibition unit is adapted to prohibit the restart determination at least until the hydraulic pressure becomes less than the predetermined hydraulic pressure after the command for automatically stopping the drive source is output.

2. The vehicle control device according to claim 1, further comprising a rotation speed detection unit adapted to detect a rotation speed of the drive source, wherein:

the restart determination prohibition unit is adapted to determine that the hydraulic pressure becomes less than the predetermined hydraulic pressure upon an elapse of a predetermined time after the rotation speed reaches a predetermined rotation speed following the output of the command for automatically stopping the drive source.

3. The vehicle control device according to claim 2, wherein the predetermined rotation speed is an idle rotation speed of the drive source.

4. The vehicle control device according to claim 2, further comprising a starter unit adapted to start the drive source, wherein:

the predetermined time is a time after which the drive source is started by the starter unit.

5. The vehicle control device according to claim 1, wherein the restart determination prohibition unit is adapted to prohibit the restart determination until a predetermined time elapses after the command for automatically stopping the drive source is output.

6. The vehicle control device according to claim 5, further comprising a rotation speed detection unit adapted to detect a rotation speed of the drive source, wherein:

the predetermined time becomes longer as the rotation speed when the command for automatically stopping the drive source is output increases.

7. A vehicle control method for controlling a vehicle including a transmission to which a torque is transmitted from a drive source, comprising:

outputting a command for automatically stopping the drive source when a first predetermined condition is satisfied and outputting a command for restarting the drive source when a second predetermined condition is not satisfied after the command for automatically stopping the drive source is output;

determining that the drive source has restarted when a third predetermined condition is satisfied after the command for restarting the drive source is output; and prohibiting the determination at least until the third predetermined condition is no longer satisfied while the third predetermined condition is satisfied and the command for restarting the drive source is output, and detecting a hydraulic pressure supplied by a hydraulic pressure supply unit adapted to be driven by the drive source and to supply the hydraulic pressure to the transmission, wherein the drive source is determined to have been restarted, assuming that the third predetermined condition has been satisfied, when the detected hydraulic pressure becomes equal to or higher than a predetermined hydraulic pressure; and wherein the restart determination is prohibited at least until the hydraulic pressure becomes less than the predetermined hydraulic pressure after the command for automatically stopping the drive source is output.

8. The vehicle control method according to claim 7, further comprising detecting a rotation speed of the drive source, wherein:

the hydraulic pressure is determined to become less than the predetermined hydraulic pressure upon an elapse of a predetermined time after the rotation speed reaches a predetermined rotation speed following the output of the command for automatically stopping the drive source.

9. The vehicle control method according to claim 8, wherein the predetermined rotation speed is an idle rotation speed of the drive source.

10. The vehicle control method according to claim 8, further comprising starting the drive source, wherein:

the predetermined time is a time after which the drive source is started.

11. The vehicle control method according to claim 7, wherein the restart determination is prohibited until a predetermined time elapses after the command for automatically stopping the drive source is output.

12. The vehicle control method according to claim 11, further comprising detecting a rotation speed of the drive source, wherein:

the predetermined time becomes longer as the rotation speed when the command for automatically stopping the drive source is output increases.

13. A vehicle control device for controlling a vehicle including a transmission to which a torque is transmitted from a drive source, comprising:

drive source control means for outputting a command for automatically stopping the drive source when a first predetermined condition is satisfied and outputting a command for restarting the drive source when a second predetermined condition is not satisfied after the command for automatically stopping the drive source is output;

drive source restart determination means for determining that the drive source has restarted when a third predetermined condition is satisfied after the command for restarting the drive source is output;

restart determination prohibition means for prohibiting a restart determination by the drive source restart determination means at least until the third predetermined condition is no longer satisfied when the third predetermined condition is satisfied and the command for restarting the drive source is output, hydraulic pressure supply means for being driven by the drive source and for supplying a hydraulic pressure to the transmission; and hydraulic pressure detection means for detecting the hydraulic pressure supplied by the hydraulic pressure supply means, wherein the drive source restart determination means is adapted to determine that the drive source has restarted, assuming that the third predetermined condition has been satisfied, when the hydraulic pressure detected by the hydraulic pressure detection means becomes equal to or higher than a predetermined hydraulic pressure; and wherein the restart determination prohibition means is adapted to prohibit the restart determination at least until the hydraulic pressure becomes less than the predetermined hydraulic pressure after the command for automatically stopping the drive source is output.

* * * * *